July 5, 1960

D. H. PEDERSEN ET AL 2,943,655

REVERSIBLE ROUTER GUIDE FOR STRAIGHT AND CIRCULAR WORK

Filed March 12, 1959

INVENTORS
DANE H. PEDERSEN
JOSEPH P. NICOTRA
BY D. Emmett Thompson
Attorney

July 5, 1960 D. H. PEDERSEN ET AL 2,943,655
REVERSIBLE ROUTER GUIDE FOR STRAIGHT AND CIRCULAR WORK
Filed March 12, 1959 6 Sheets-Sheet 6

INVENTORS
DANE H. PEDERSEN
JOSEPH P. NICOTRA
BY D. Emmett Thompson
Attorney

United States Patent Office 2,943,655
Patented July 5, 1960

2,943,655
REVERSIBLE ROUTER GUIDE FOR STRAIGHT AND CIRCULAR WORK

Dane H. Pedersen and Joseph Paul Nicotra, Syracuse, N.Y., assignors to The Porter-Cable Machine Company, Syracuse, N.Y., a corporation of New York Filed Mar. 12, 1959, Ser. No. 798,915

7 Claims. (Cl. 144—136)

This invention relates to an improved guide for use in conjunction with hand-manipulated, power-operated, routers.

Portable power-operated routers of the type as shown in Patent No. 2,613,704, to E. P. Sacrey, October 14, 1952, are used extensively in making many kinds of cuts in various types and shapes of work pieces.

This invention has as an object a router guide embodying a structure particularly economical to manufacture and assemble and which, by convenient adjustments, is effective to guide the router in making the various kinds of cuts on various types of work.

The invention consists in the novel features and in the combinations and constructions hereinafter set forth and claimed.

In describing this invention, reference is had to the accompanying drawings in which like characters designate corresponding parts in all the views.

In the drawings—

Figure 1:
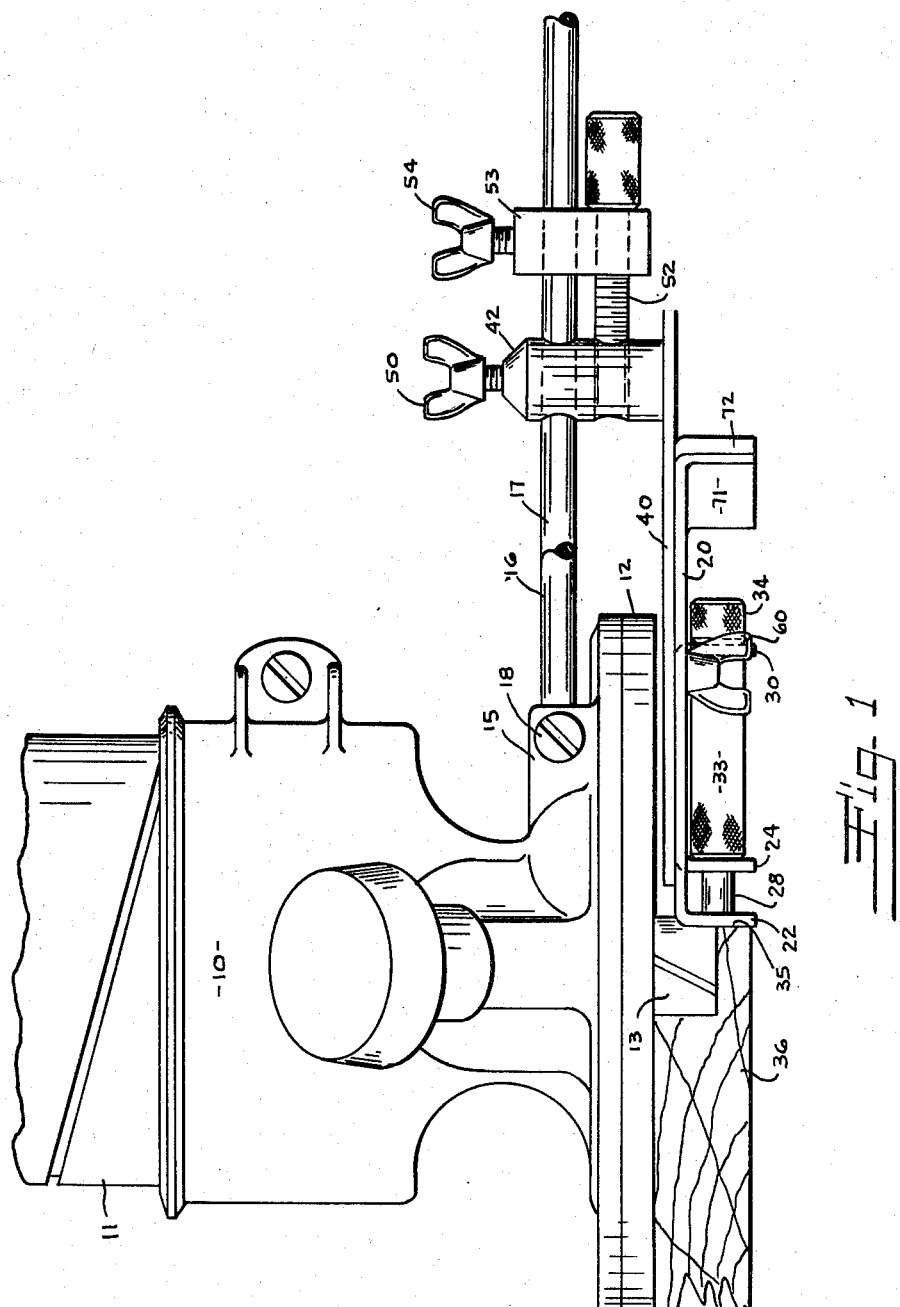
Figure 1 is a side elevational view of the base portion of a router with the guide structure attached thereto.

In Figure 1 is shown the base member 10 in which the router motor 11 is mounted for vertical adjustment. A base plate 12 is usually affixed to the under side of the base member 11, and is usually formed of plastic material to lessen the possibility of marring the work as the router is moved over the surface thereof. The router motor is vertically mounted in the base 10, and a cutter 13 is secured to the lower end of the motor shaft, and the depth of the cut taken by the cutter 13 is controlled by the vertical position of the motor in the base, the cutter 13 depending through a central hole 14 formed in the base plate 12. This router structure and arrangement is conventional.

The base 10 is formed with a pair of bosses 15 provided with horizontal apertures in which rods 16, 17, are slidably mounted and secured in adjusted position by screws 18. The conventional guide member heretofore used with these routers is carried by the rods 16, 17, and consists of a one-piece, integral casting extending downwardly from the rods and having a straight edge for engaging the edge of the work piece to determine the extent of the engagement in a lateral direction of the cutter with the work piece.

The guide of our invention consists of a guide plate 20 formed with a concavity 21 located centrally at one edge of the plate. The plate is formed with a depending flange 22 located on one side of the concavity 21 and with a second depending flange 24 located on the opposite side of the concavity. The flanges 22, 24, are preferably formed integral with the plate 20 and extend in parallel relation to that edge of the plate. However, the flange 24 is offset inwardly from the plane of the flange 22, and is apertured to slidably receive pins 26, 28.

Figure 3:
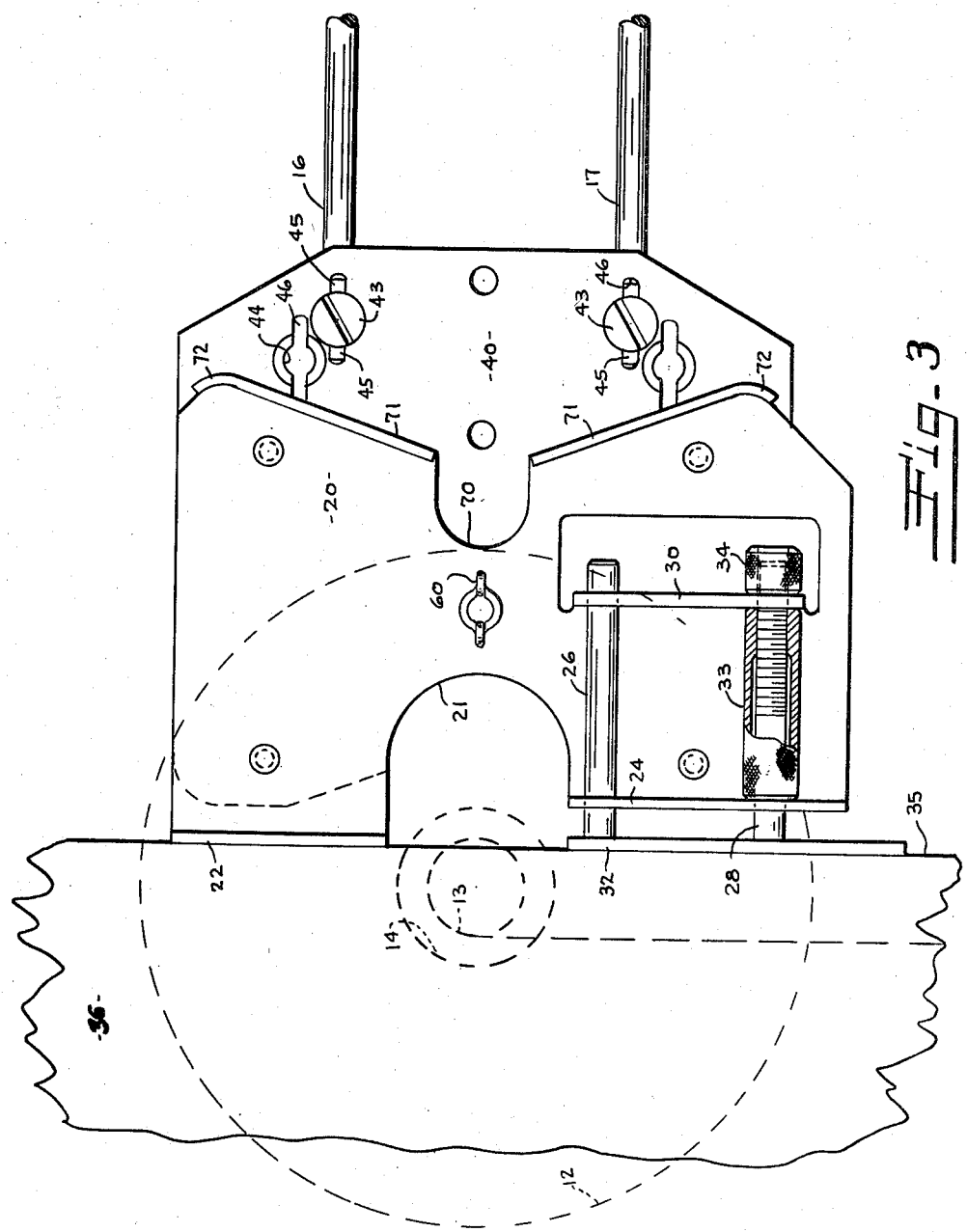
Figure 3 is a bottom plan view of the arrangement shown in Figure 2.

The plate 20 is also formed with a flange 30 positioned inwardly from the flange 24 and extending parallel thereto, and is also formed with apertures spaced complemental to the apertures in the plate 24 for slidably receiving the inner ends of the pins 26, 28, see Figure 3. A work engaging shoe 32 is fixedly secured to the outer ends of the pins 26, 28. The pin 28 is threaded a substantial distance from its inner end to receive a sleeve adjusting nut 33 which has a length comparable to the spacing between the flanges 24, 30. A lock nut 34 is positioned on the inner end of the pin 28. With this arrangement, the shoe 32 is adjustable toward and from the plane of the fixed flange 22, shown in Figure 3 as the edge 35 of the work piece 36.

The guide plate 20 is attached to the router base 10 by a support means which includes the rods 16, 17, and a support plate 40. The rods 16, 17, extend through posts 41, 42. These posts are secured to the support plate 40 by flat head screws 43 extending through apertures 44 formed in the plate 40, and threading into the posts. The posts are formed at their lower ends with tangs 45 positioned in slots 46 formed in the support plate 40, and extending on diametrically opposite sides of the apertures 44 through which the screws 43 extend.

The posts 41, 42, are thus fixedly secured to the plate 40 and are apertured for sliding movement on the rods 16, 17, toward and from the axis of the cutter 13. The posts are provided with thumb screws 50 which may be tightened to clamp the posts to the rods when the plate 40 is in adjusted position. In order to provide for the movement of the plate 40 to a slight extent, or to conveniently make a fine adjustment thereof, one of the posts, as the post 42, is formed with a threaded aperture 51 in which is mounted a screw 52 journalled in a block 53 slidably mounted on the rod 17 and fixed thereto by a thumb screw 54. With this arrangement, the plate 40 is moved to approximately the desired position, the screw 54 tightened, and the plate then moved slightly by rotation of the screw 52, whereupon the thumb screws 50 are tightened to fixedly secure the assembly in adjusted position.

The guide plate 20 is formed with countersunk apertures 55, 56, 57 and 58, arranged in a row centrally of the plate. The guide plate 20 is affixed to the support plate 40 by a screw 59 positioned in the aperture 56 and extending through a centrally located aperture in the guide plate, the assembly being secured together by a thumb nut 60 threaded onto the screw. Relative rotation between the plates, when clamped together, is prevented by projections 62 formed on the guide plate 20. These projections are uniformly spaced about the axis of the screw 59, and extend upwardly into complemental apertures formed in the support plate 40.

Figure 2:
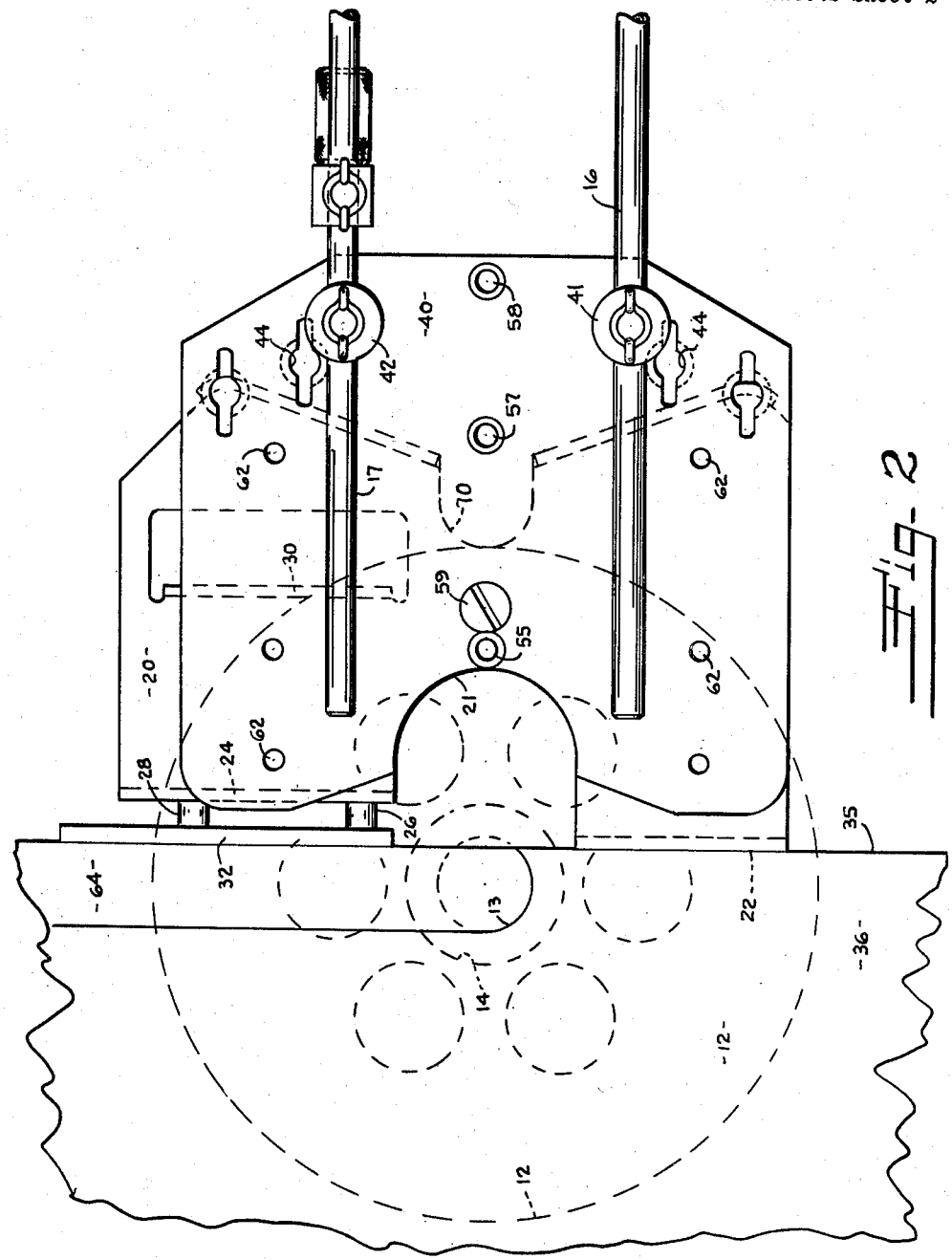
Figure 2 is a top plan view of the guide structure arrangement shown in Figure 1, with the router base plate shown in dotted lines.

In Figures 1 and 2, the guide plate is attached to the supporting means with the flanges 22, 24, confronting the cutter 13, and the device is shown in connection with the formation of a rabbet cut, the shoe 32 being moved outwardly from the flange 24 in alignment with the flange 22, whereby the flange 22 and the shoe 32 move along the edge 35 of the work piece 36. As shown in Figure 2, the cut ledge is indicated at 64 extending through the upper half of the view. In other words, the router is being moved on the work piece in a direction downwardly in Fig. 2.

When the work piece is of irregular form or circular shape, as indicated at 65, in Figure 4, the thumb nut 60 is loosened to permit the guide plate to be lowered a short distance below the support plate 40, to move the projections 62 out of the apertures in the support plate, whereupon the guide plate may be rotated about the axis of the screw to bring the opposite side edge of the guide plate into confronting relation with the cutter and work piece. This opposite edge of the plate is also formed with a centrally located concavity 70 and with a pair of depending flanges 71 inclined to converge towards the concavity 70. The outer ends of the flanges 71 are curved, as at 72. With the guide plate clamped to the support plate in this position, the perimeter 75 of the circular work piece 65 is engaged by the flanges 71, extending at the obtuse angle, to thereby effect proper engagement of the cutter 13 with the edge of the work piece.

It will be observed that the guide structure thus far described can be quickly and conveniently changed for use on work pieces having a straight edge to work pieces having a curved edge. The adjustable shoe member 32 permits the guide to be also used in planing operations, the shoe 32 being adjusted toward and from the plane of the fixed flange 22 to effect the desired depth of cut in the planing operation.

Figure 4:
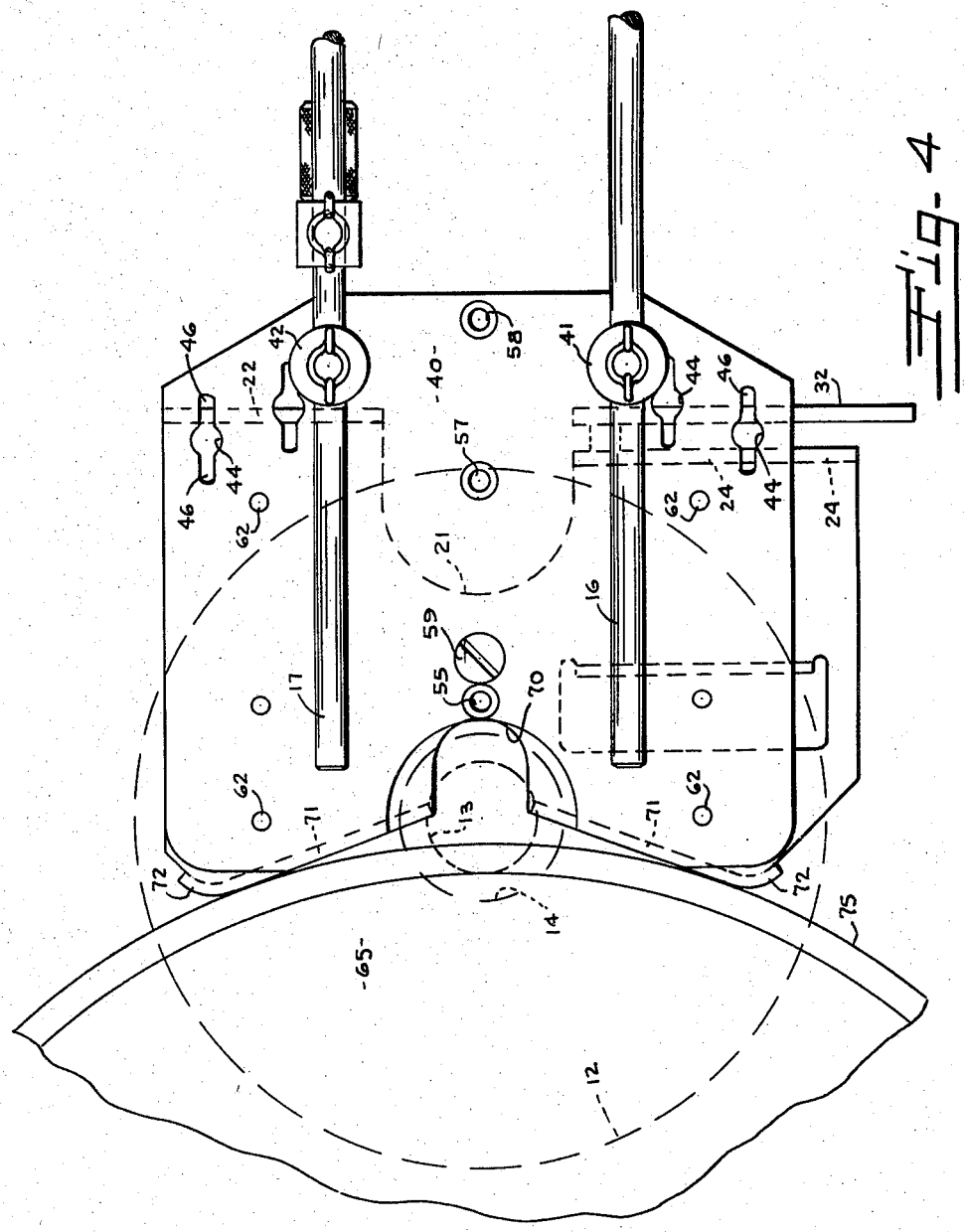
Figure 4 is a view, similar to Figure 3, illustrating the guide arranged for use in connection with a curved work piece.

Referring to Figures 2 and 4 for example, it will be observed that there are three sets of the apertures 44, the posts 41, 42, being shown positioned in the inner pair of apertures. The purpose of the additional pairs of apertures is to provide for use of the guide structure with different sizes of routing machines, wherein the spacing between the bosses 15 carrying the support rods 16, 17, varies according to the size of the router. In Figures, such as 2, 3 and 4, the relative position of the router is indicated by the dotted outline of the base plate 12.

The guide structure is conveniently arranged for guiding the router in making grooves extending in parallel relation in a work piece. In this connection, a channel bar 78 is affixed to the support plate 40 by a screw 79 positioned in the aperture 55 of the support plate and threading into the bar 78. The bar 78 is also formed with projections 80, similar to the projections 62, on the guide plate, these projections entering apertures 82 formed in the support plate 40.

Figure 5:
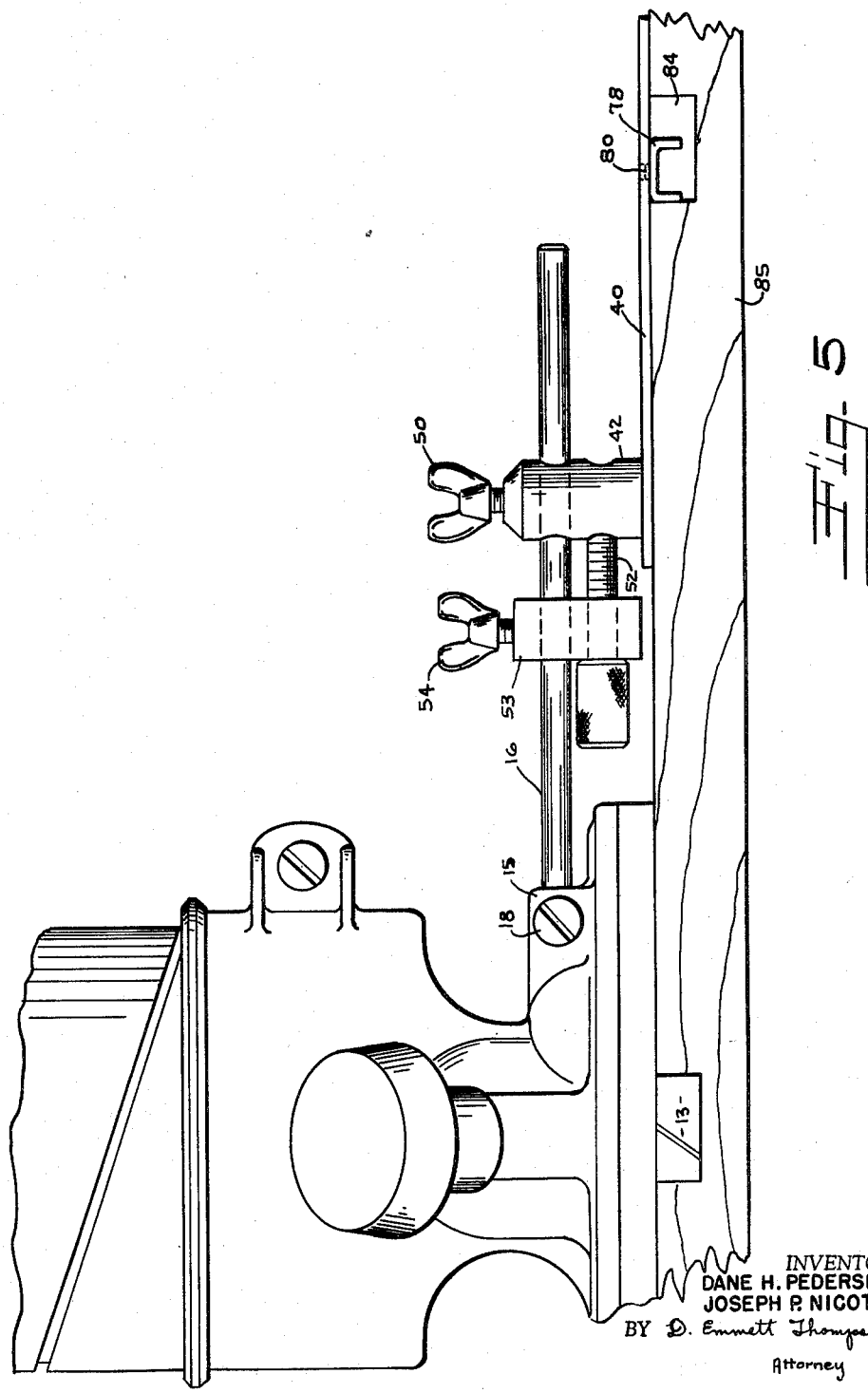
Figure 5 is a view, similar to Figure 1, with the guide arranged for use in making parallel grooves.

In use, a groove 84 is formed in the work piece 85, see Figure 5. The guide plate 40 is adjusted the proper distance from the router, and the guide bar 78 is positioned in the groove 84 which spaces the cutter 13 of the router the desired distance to form a second groove extending parallel with the groove 84. In Figure 5, it will be observed that the guide plate 40 has been turned around on the rods 16, 17, to provide for a greater spacing of the guide bar 78 from the cutter 13.

Figure 6:
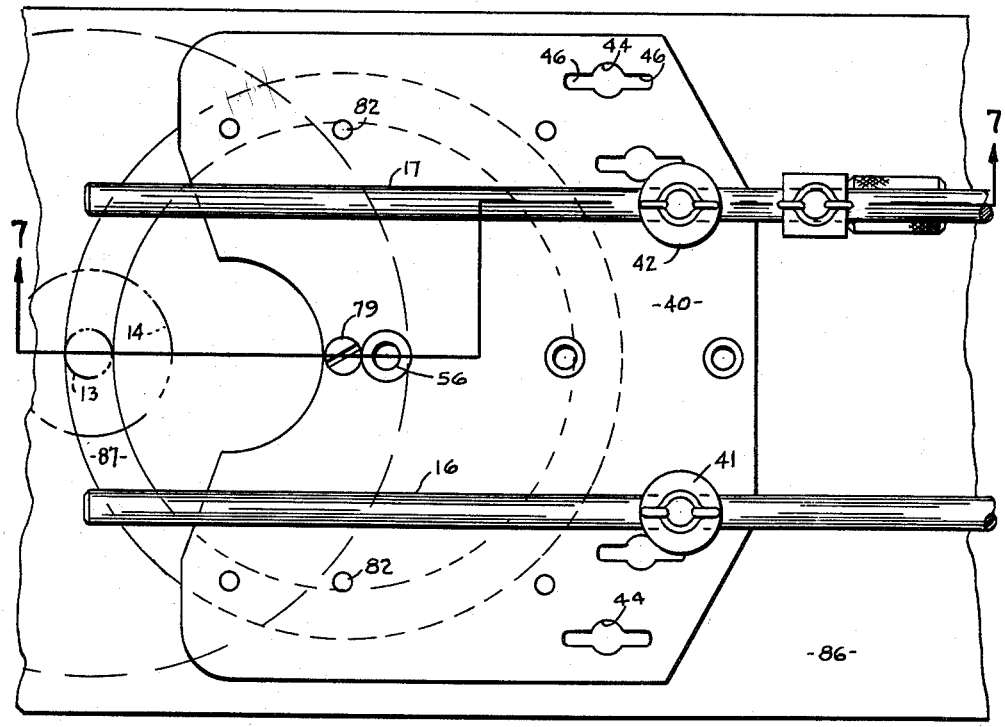
Figure 6 is a top plan view, similar to Figure 2, illustrating the guide arranged for making circular cuts.
Figure 7:
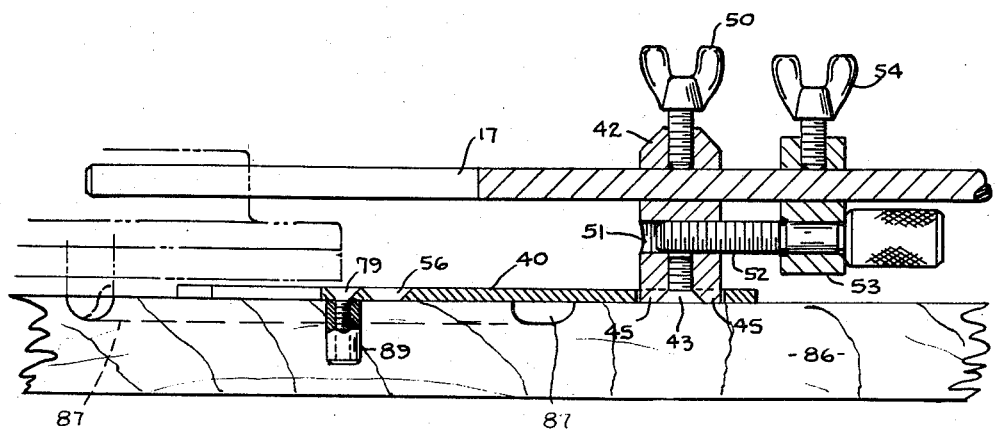
Figure 7 is a view taken on line 7—7, Figure 6.

The guide structure is also conveniently adapted for making circular cuts in work pieces, as illustrated in Figures 6 and 7, wherein the work piece is indicated at 86, and the circular cut at 87. In this instance, the screw 79 positioned in one of the holes 55, 57, 58, is employed to secure a stud 89 to the under side of the support plate 40. This stud is positioned in an aperture formed in the work piece 86 at the axis of the desired circular cut 87. The router and guide structure is then rotated about the axis of the stud 89 to produce the circular cut 87. In this connection, adjustment of the support plate toward and from the cutter determines the diameter of the circular cut 87, as is apparent. Also, the width of the various cuts is determined by the diameter of the cutter used.

It will be apparent from the structural arrangement of our router guide, that it can be economically constructed in the main by sheet metal stampings and that it serves for guiding the router in making cuts on both straight and circular work pieces and for grooves, and for producing circular cuts. It is of light weight and convenient to adjust for various cuts and yet is particularly rigid and accurate in use.

What we claim is:

1. A router guide comprising a guide plate formed with a concavity centrally at one edge thereof and having a flange depending from said edge at each side of said concavity, said flanges extending in parallel relation to said edge, the opposite edge of said guide plate being also formed with a concavity centrally thereof and having a pair of straight flanges depending from said opposite edge and converging toward said last-mentioned concavity, said flanges extending at an obtuse angle for engagement with the perimeter of a circular work piece, support means for detachably securing said guide plate to the base of the router for movement toward and from the axis of the router cutter, said plate being rotatable on said support means to position either of said flanged edges of the plate in confronting relation to the cutter.

2. A router guide comprising a guide plate formed with a concavity centrally at one edge of the plate, said plate having a first flange depending from said edge at one side of said concavity and having a second flange depending from said edge at the opposite side of said concavity, said flanges extending in parallel relation to said edge, said second flange being offset inwardly from the plane of said first flange, a guide shoe slidably mounted in said second flange for movement toward and from the plane of said first flange, and means for securing said shoe in adjusted position, said guide plate being formed at its opposite side edge with a centrally arranged concavity and having a pair of flanges depending from said opposite edge and converging toward said last-mentioned concavity, support means for detachably securing said guide plate to the base of the router for movement toward and from the axis of the router cutter, said plate being rotatable on said support means to position either of said flanged edges of the plate in confronting relation to the cutter.

3. A router guide comprising a guide plate formed with a concavity centrally at one edge of the plate, said plate having a first flange depending from said edge at one side of said concavity, and having a second flange depending from said edge at the opposite side of said concavity, said flanges extending in parallel relation to said edge, said second flange being offset inwardly from the plane of said first flange, said plate being formed with a third flange spaced inwardly from said second flange, a guide shoe having support means slidably mounted in said second and third flanges, means for adjusting said guide shoe toward and from the plane of said first flange, said guide plate being formed at its opposite side edge with a centrally arranged concavity and having a pair of flanges depending from said opposite edge and converging towards said last-mentioned concavity, support means for detachably securing said guide plate to the base of the router for movement toward and from the axis of the router cutter, said plate being rotatable on said support to position either of said flanged edges of the plate in confronting relation to the cutter.

4. A router guide for use in effecting cutting operations on both straight and curved work pieces comprising a guide plate formed with a concavity centrally located at one side edge of the plate, said plate having a work engaging straight edge fixedly secured to said side edge at one side of said concavity, a work engaging shoe mounted on the plate at the opposite side of said concavity for adjustment toward and from the plane of said fixed work engaging straight edge, said plate being formed at its opposite edge with a second centrally located concavity, a work engaging member fixedly secured to the plate on each side of said last-mentioned concavity, said members converging toward said concavity, support means for detachably securing said guide plate to the base of the router for movement toward and from the axis of the router cutter, and including a flat support plate, means for detachably securing said guide plate to the under surface of said support plate, said guide plate being rotatable on said support plate to position either of said edges thereof in confronting relation to the cutter.

5. A router guide comprising a flat guide plate formed with a centrally located concavity at opposite side edges thereof, a pair of work engaging members carried by said plate at opposite sides of the concavity at one side edge of the plate and extending in parallel relationship, said plate having a pair of work engaging members depending from said opposite edge at opposite sides of the concavity on said edge and being located outwardly thereof, a support plate, means for detachably securing said support plate to the router base for movement toward and from the same, a screw fastener for detachably securing said guide plate to the under surface of said support plate, said guide plate being rotatable about said screw fastener to present either of said edges of said guide plate in confronting relation to the router cutter.

6. A router guide for use in effecting parallel grooves in work pieces comprising a pair of support rods extending outwardly from the router base in a direction normal to the axis of the router cutter, a support plate, means detachably securing said plate to said rods for adjustment toward and from the router cutter with said plate extending in parallel relation to said rods, and a guide bar detachably secured to said plate and depending therefrom for sliding movement in a previously formed groove in the work piece.

7. A router guide for use in effecting parallel grooves in work pieces comprising a pair of support rods fixed to the router base in spaced apart relation and extending outwardly therefrom in a direction normal to the axis of the router cutter, a support plate provided with a pair of upstanding post members apertured for sliding movement on said support rods for adjusting said plate toward and from the router cutter, a channel-shaped guide bar detachably secured to the under side of said plate for sliding movement in a groove previously formed in the work piece.

References Cited in the file of this patent
UNITED STATES PATENTS

| | | |
|---|---|---|
| 1,745,780 | Casey | Feb. 4, 1930 |
| 2,587,994 | Gregory | Mar. 4, 1952 |
| 2,672,898 | Schuster | Mar. 23, 1954 |
| 2,756,785 | Godfrey | July 31, 1956 |
| 2,839,107 | Emmons | June 17, 1958 |

FOREIGN PATENTS

| | | |
|---|---|---|
| 494,489 | Italy | May 25, 1954 |
| 1,002,118 | Germany | Feb. 7, 1957 |